United States Patent [19]

Nudd et al.

[11] Patent Number: 5,067,692

[45] Date of Patent: Nov. 26, 1991

[54] SWIVEL JACK FOR A TRAILER TONGUE

[75] Inventors: Barry C. Nudd; James W. Chambers, both of Rockford, Ill.

[73] Assignee: Atwood Industries, Inc., Rockford, Ill.

[21] Appl. No.: 532,875

[22] Filed: Jun. 4, 1990

[51] Int. Cl.$^5$ .............................................. B60S 9/02
[52] U.S. Cl. ...................................... 254/420; 403/96
[58] Field of Search .............. 254/420, 424, 418, 425; 248/674, 200.1, 291, 284, 286; 403/96, 92

[56] References Cited

U.S. PATENT DOCUMENTS

| | | | |
|---|---|---|---|
| 2,882,070 | 4/1959 | Bill | 254/420 |
| 3,425,714 | 2/1969 | Morris | 254/420 |
| 3,934,852 | 1/1976 | Weber et al. | 254/420 |
| 4,169,579 | 10/1979 | Moll | 254/420 |
| 4,623,125 | 11/1986 | Ebey | 254/420 |

Primary Examiner—Robert C. Watson

Attorney, Agent, or Firm—Leydig, Voit & Mayer, Ltd.

[57] ABSTRACT

A jack is mounted on a trailer tongue by a swivel connection to pivot between a vertically disposed active position and a horizontally disposed stowed position. The swivel connection includes a spacer sandwiched between a bracket on the tongue of the trailer and a bracket on the housing of the jack and rotatably received in a hole in the tongue bracket. The spacer serves to hold the two brackets out of contact with one another. A bolt extends through the housing bracket and the spacer with a non-rotatable fit and causes the housing bracket and the spacer to turn in unison relative to the tongue bracket. A nut and washer on the inner end of the bolt clamp the brackets together while allowing the housing bracket to pivot relative to the tongue bracket. The tongue bracket may either be clamped to the tongue by bolts or may be bolted to still another bracket which is welded to the tongue.

10 Claims, 3 Drawing Sheets

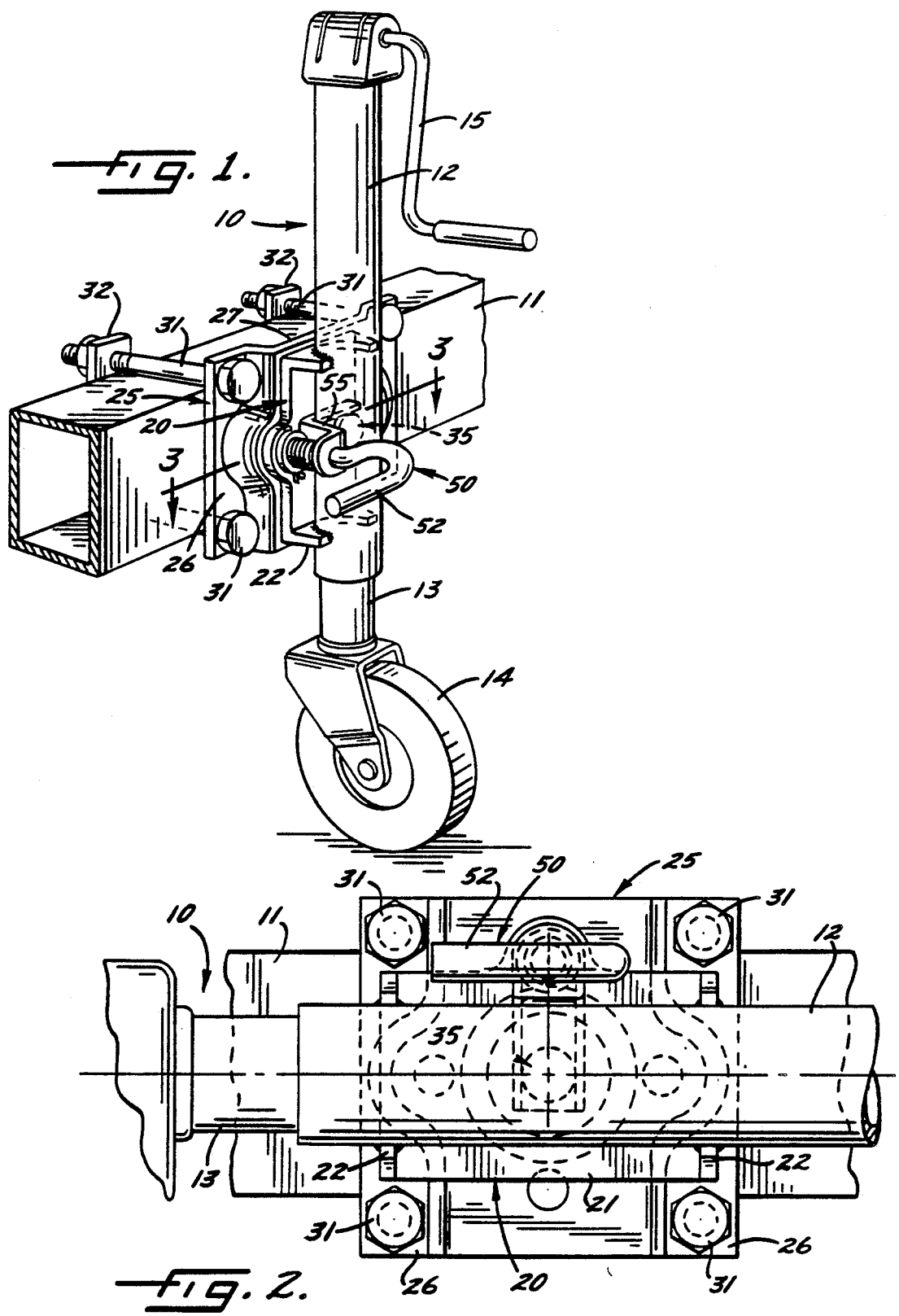

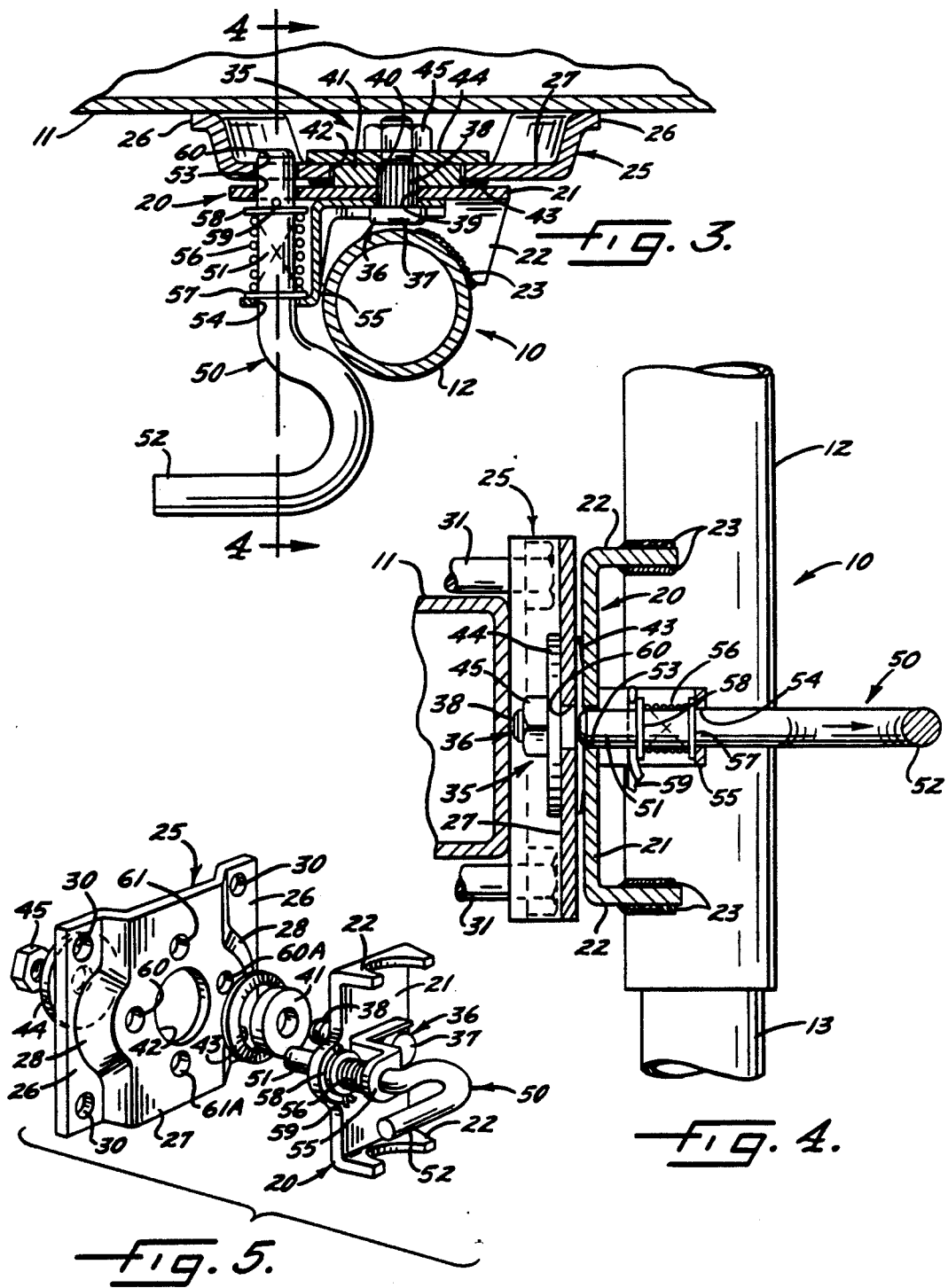

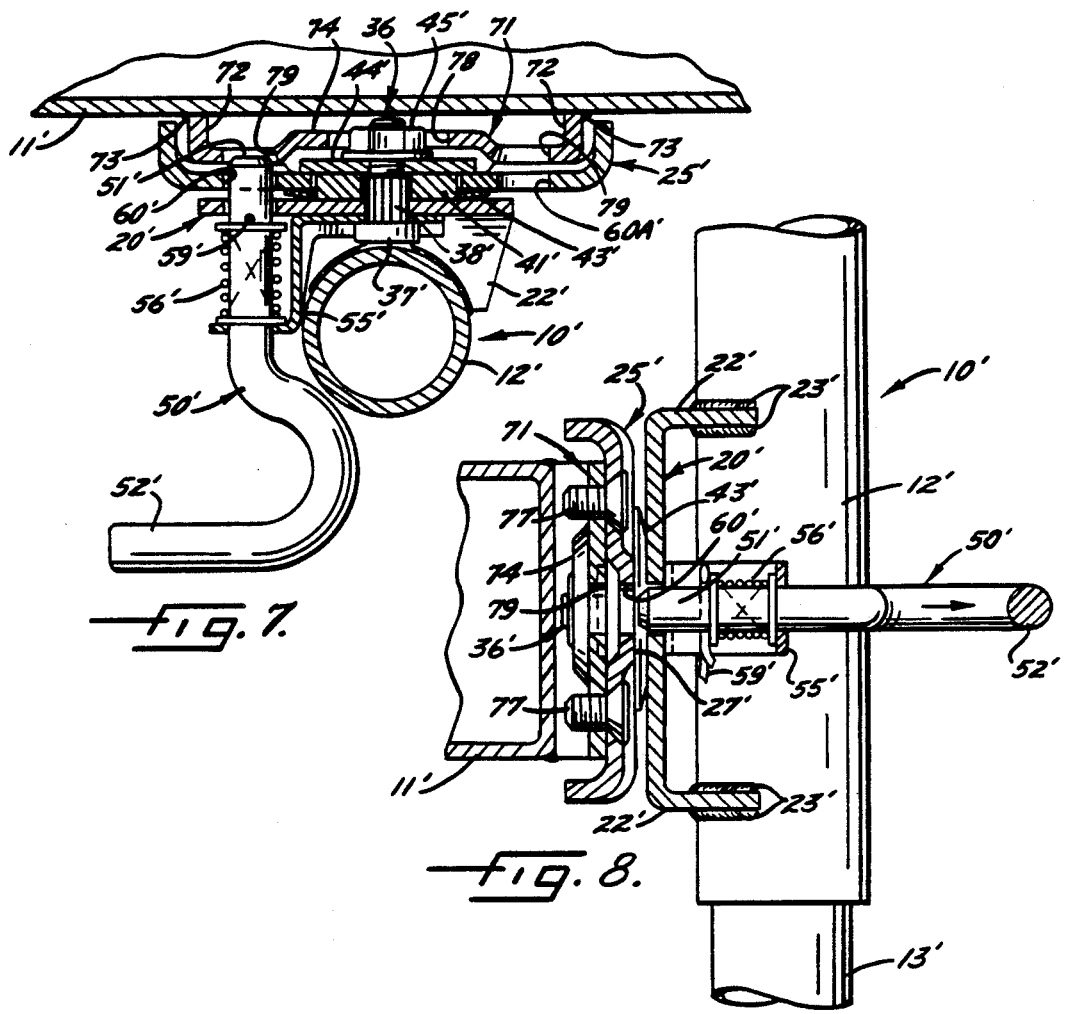
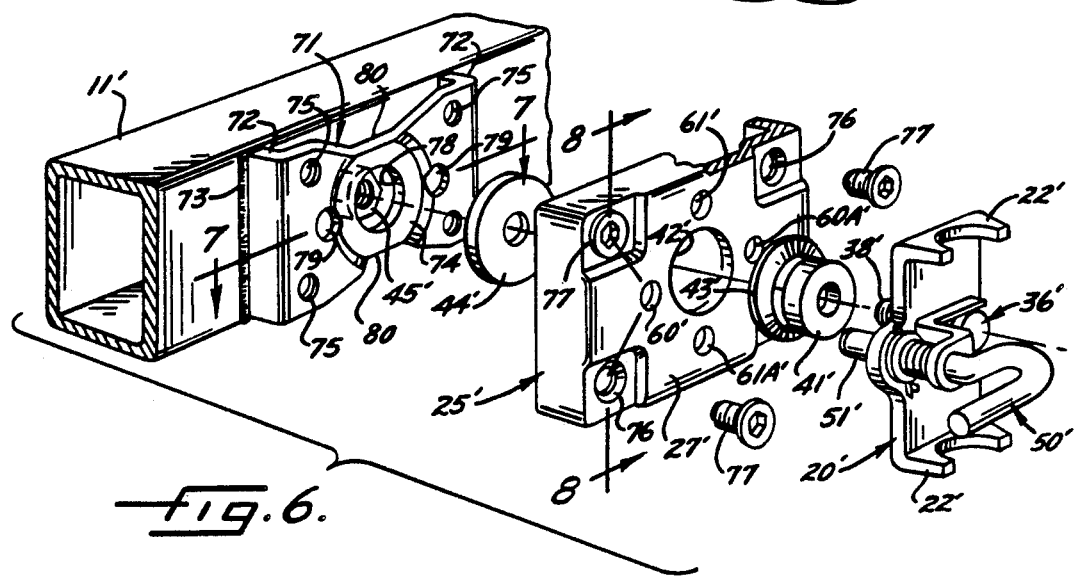

SWIVEL JACK FOR A TRAILER TONGUE

BACKGROUND OF THE INVENTION

This invention relates to a jack adapted to be attached to the tongue of a trailer and adapted, when actuated, to lift the tongue upwardly from the hitch of the towing vehicle and to support the tongue from the ground after the towing vehicle has been driven away.

The invention more particularly relates to a jack which is adapted to be pivoted on the tongue between an active position and a stowed position. When the jack is in its active position, it extends vertically and may be used to raise or lower the tongue. After the tongue has been coupled to the towing vehicle, the jack may be pivoted about a generally horizontal axis and moved to a stowed position in which the jack lies alongside the tongue. A swivel jack of this general type is disclosed in Ebey U.S. Pat. No. 4,623,125.

A jack of the above type includes a first bracket which is secured to the tongue of the trailer and a second bracket which is secured to the housing of the jack. It is important that the mounting for the jack be rigid and, at the same time, allow the jack to be easily pivoted between its positions. Prior jacks have been unable to achieve these goals at a reasonable cost.

SUMMARY OF THE INVENTION

The general aim of the present invention is to provide a trailer jack having an extremely simple, inexpensive and vertically rigid swivel connection which reduces deflection and distortion of the jack housing when the jack is in its active position and which enables the jack to be freely pivoted back and forth between its positions.

A more detailed object of the invention is to achieve the foregoing through the provision of a swivel connection which enables the jack housing to be located closely adjacent the tongue bracket in order to reduce the turning moment imposed on the housing and thereby reduce metal deflection and distortion.

In still a more detailed sense, the invention is characterized by a swivel connection having a unique spacer between the tongue and housing brackets and having clamping components which are assembled from the inner side of the tongue bracket.

These and other objects and advantages of the invention will become more apparent from the following detailed description when taken in conjunction with the accompanying drawings.

BRIEF DESCRIPTION OF THE DRAWINGS

FIG. 1 is a perspective view showing a trailer tongue equipped with one embodiment of a new and improved swivel jack incorporating the unique features of the present invention, the jack being illustrated in its active position.

FIG. 2 is an enlarged fragmentary side elevational view of the jack and shows the jack swiveled to its stowed position.

FIG. 3 is an enlarged fragmentary cross-section taken substantially along the line 3—3 of FIG. 1.

FIG. 4 is a fragmentary cross-section taken substantially along the line 4—4 of FIG. 3.

FIG. 5 is an exploded perspective view of the brackets and the swivel connection.

FIG. 6 is a view generally similar to FIG. 5 but shows another embodiment of the invention.

FIGS. 7 and 8 are views generally similar to FIGS. 3 and 4, respectively, but show the second embodiment and are taken substantially along the lines 7—7 and 8—8, respectively, of FIG. 6.

DETAILED DESCRIPTION OF THE PREFERRED EMBODIMENTS

As shown in the drawings for purposes of illustration, the invention is embodied in a jack 10 attached to the tongue 11 of a trailer (not shown) and adapted to lower and raise the tongue to facilitate coupling of the trailer to and uncoupling of the trailer from a towing vehicle. When the trailer is uncoupled, the jack supports the tongue from the ground and helps keep the trailer in a level position.

The jack 10 itself is of conventional construction and includes an elongated tubular housing 12 which telescopically receives a lift tube 13, there being a caster wheel 14 on the lower end of the lift tube. By turning a hand crank 15 at the upper end of the housing, the lift tube may be extended out of the housing to raise the tongue 11 or may be retracted into the housing to lower the tongue.

A housing mounting bracket 20 is secured to the jack housing 12 near the lower end thereof. The bracket 20 includes a flat upright plate 21 (FIG. 5) with upper and lower horizontally projecting ears 22 which cradle the housing. The housing is rigidly welded to the ears as indicated at 23 (FIG. 4).

The housing bracket 20 is connected to a bracket 25 which, in turn, is secured to the tongue 11. In the embodiment which has been shown in FIGS. 1 to 5, the bracket 25 includes front and rear mounting flanges 26 (FIG. 5) adapted to lie against one side of the tongue and formed integrally with a flat vertical plate 27 which is spaced away from the tongue by virtue of outwardly projecting webs 28 which joint the plate to the flanges. Holes 30 (FIG. 5) are formed in the flanges 26 and receive bolts 31 (FIGS. 1 and 2) which extend across the top and bottom of the tongue. The bolts also extend through upright bars 32 which cause the bracket 25 to become clamped to the tongue when the bolts are tightened.

The jack 10 is adapted to be pivoted from its upright active position shown in FIG. 1 to a horizontal stowed position shown in FIG. 2. When the jack is swiveled to its stowed position, it extends along one side of the tongue 11 and locates the wheel 14 well above the ground.

In accordance with the present invention, the housing bracket 20 is coupled to the tongue bracket 25 by a swivel connection 35 (FIG. 3) which is of simple and low cost construction but which provides good rigidity and locates the jack 10 so as to reduce deflection and distortion of the housing bracket 20 when the jack is in its active position. Herein, the swivel connection 35 includes a bolt 36 having a head 37 located adjacent the outer side of the plate 21 of the housing bracket 20 and having a shank 38 which extends inwardly through a circular hole 39 in the plate 21 with a press fit. To enable the bolt to be pressed into the plate 21 with a tight fit, the position of the shank 38 adjacent the head 37 is formed with a straight knurl. The extreme free end portion of the shank 38 is threaded in a conventional manner.

The knurled portion of the bolt 36 also is received with a press fit in a circular hole 40 (FIG. 3) formed in a circular spacer disc 41. The latter is located with a close fit but with rotatable clearance in a relatively large circular opening 42 formed in the plate 27 of the tongue bracket 25. As shown in FIG. 3, the spacer disc 41 is somewhat thicker than the plate 27 and thus projects axially from the plate. A cupped spring washer 43 encircles the spacer disc 41 and is sandwiched between the plates 21 and 27 of the two brackets 20 and 25 to establish a preload between the brackets and prevent rattling when the jack 10 is in its stowed position.

The swivel connection is completed by a washer 44 and a nut 45 (FIG. 3). The washer has a diameter larger than the diameter of the opening 42 and is located adjacent the inner side of the plate 27 of the tongue bracket 25 while the nut is threaded onto the free end portion of the shank 38 of the bolt 36. The shank extends freely through the hole in the washer.

With the foregoing arrangement, the two brackets are held in assembled relation by the washer 44 and the nut 45 at the inner side of the tongue bracket. The spacer 41 holds the plate 21 of the housing bracket 20 out of frictional contact with the plate 27 of the tongue bracket 25 to allow free pivoting of the jack 10. When the jack is pivoted, the housing bracket 20, the bolt 39 and the spacer 41 all turn in unison relative to the tongue bracket 25. By virtue of the spacer being located within the opening 42 in the plate 27 of the tongue bracket—and because the washer 44 and the nut 45 are located at the inner side of the plate 27—the jack housing 12 may be positioned relatively close to the point where the force is transmitted to the tongue bracket. In other words, the moment arm between the housing 12 and the bracket 25 is relatively short so as to reduce deflection of the housing when the latter is in its active position. This provides good vertical rigidity.

A selectively releasable latch 50 is provided in order to hold the jack 10 in either its active position or its stowed position. Herein, the latch includes a transversely extending rod 51 (FIGS. 3 to 5) whose outer end is joined to an integral handle 52. The rod 51 of the latch is guided slidably by a hole 53 in the plate 21 of the housing bracket 20 and by a hole 54 formed in a generally S-shaped retainer 55. A portion of the retainer 55 receives the shank 38 of the bolt 36 and is clamped against the outer side of the plate 21 of the housing bracket 20 by the head 37 of the bolt.

A coil spring 56 is telescoped over the rod 51 of the latch 50 and is captivated between two washers 57 and 58 (FIG. 3) on the rod. The washer 57 lies against the retainer 55 while the washer 58 is held on the rod by a pin 59 which extends radially through the rod. The spring urges the latch rod 51 inwardly toward a latched position and, when the jack 10 is in its upright active position, the inner end portion of the rod normally projects into a hole 60 in the plate 27 of the tongue bracket 25 as shown in FIG. 3 in order to lock the jack in its active position. By pulling outwardly on the handle 52, the rod 51 may be withdrawn from the hole 60 as shown in FIG. 4 to permit the jack to be pivoted around the swivel connection 35 and moved to its stowed position. When the jack is in its stowed position, the rod enters another hole 61 (FIG. 5) in the plate 27 as the handle is released and thereby serves to lock the jack 10 in its stowed position. The plate 27 is formed with two additional holes 60A and 61A which serve the same purpose as the holes 60 and 61, respectively, and which enable the tongue bracket 25 to be installed in a position turned 90, 180 or 270 degrees from that shown in the drawings.

As pointed out above, the tongue bracket 25 is adapted to be anchored to the tongue 11 by the bolts 31 which extend across the top and bottom of the tongue. In some instances, it is desirable to eliminate the bolts across the top and bottom of the tongue and to attach the jack 10 directly to the side of the tongue. While it is possible to weld the bracket 25 directly to the tongue, such direct welding is not practical or aesthetically pleasing when, as usually is the case, the bracket is plated with zinc or other corrosion-resistant metal. Moreover, direct welding of the bracket 25 to the tongue 11 would require that the jack 10 be fully assembled with the bracket 25 at the time of welding since the nut 45 cannot be easily installed after the welding has been effected.

FIGS. 6 to 8 show a jack 10' with a bracket assembly which may be welded directly to the tongue 11'. The bracket assembly of FIGS. 6 to 8 includes a bracket 25' which is generally similar to the bracket 25 and which is adapted to be secured releasably to a weld bracket 71. The weld bracket 71 is adapted to be welded directly to the tongue 11' and is concealed by the bracket 25' when the latter is attached to the weld bracket.

More specifically, the weld bracket 71 is generally dish-shaped and includes front and rear flanges 72 which are adapted to be welded to the tongue 11 at 73. The weld bracket 71 also includes a plate 74 which is integral with the flanges and which is spaced away from the side of the tongue by the flanges. Tapped holes 75 are formed in the four corner portions of the plate 74 while alined holes 76 are formed in the plate 27' of the bracket 25'.

After the bracket 71 has been welded to the tongue 11', the bracket 25' with the jack 10' assembled therewith, is attached to the bracket 71 by inserting flat-headed cap screws 77 through the holes 76 and threading the screws into the holes 75. The central portion of the plate 74 is formed with an enlarged opening 78 for accommodating the nut 45' of the swivel connection 35'. In addition, the central portions of the plates 27' and 74 are dished in opposite directions to accommodate the nut. Holes 79 are formed in the plate 74 to accommodate the latch rod 51' when the jack 10' is in its active position. The upper and lower edges of the plate 74 are recessed as indicated at 80 in order to provide clearance for the rod 51' when the jack is in its stowed position.

We claim:

1. A jack adapted to be attached to a generally horizontal trailer tongue and adapted to be selectively located in an upright active position or in a generally horizontal stowed position, said jack comprising an elongated tubular housing, a housing bracket fixed to said housing and having inner and outer sides with a hole of predetermined diameter extending therebetween, a tongue bracket adapted to be anchored to said tongue and having inner and outer sides with a hole of larger diameter extending therebetween, the inner side of said housing bracket being disposed in opposing relation with the outer side of said tongue bracket, means connecting said housing bracket to said tongue bracket for pivoting of the housing bracket about a generally horizontal axis extending transversely of said tongue thereby to support said jack for movement between said positions, said means comprising a spacer disposed in said hole in said tongue bracket with close rotatable clearance and having an opening therethrough, a bolt having a head located adjacent the outer side of said housing bracket and having a shank extending through said hole in said housing bracket and through said opening in said spacer, said spacer and said housing bracket being connected to rotate in unison, a washer encircling said shank and located adjacent the inner side of said tongue bracket, said washer having a diameter greater than the diameter of the hole in said tongue bracket, and a nut threaded on said shank and coacting with said head to hold said washer, said spacer and said housing bracket in assembled relation, said spacer holding said housing bracket and said washer out of clamping engagement with said tongue bracket.

2. A jack as defined in claim 1 in which a portion of said shank extends through said hole in said housing bracket and through said opening in said spacer with a non-rotatable fit in order to connect said spacer and said housing bracket to rotate in unison.

3. A jack as defined in claim 2 in which said portion of said shank is inserted into said hole in said housing bracket and said opening in said spacer with a press fit in order to couple said bolt nonrotatably with said housing bracket and said spacer.

4. A jack as defined in claim 3 in which said shank portion is knurled in order to enhance said press fit.

5. A jack as defined in claim 1 further including a spring washer encircling said spacer and sandwiched between the inner side of said housing bracket and the outer side of said tongue bracket.

6. A jack as defined in claim 1 in which the axial thickness of said spacer is greater than the axial dimension of said hole in said tongue bracket.

7. A jack as defined in claim 3 in which the axial thickness of said spacer is greater than the axial dimension of said hole in said tongue bracket.

8. A jack as defined in claim 7 further including a spring washer encircling said spacer and sandwiched between the inner side of said housing bracket and the outer side of said tongue bracket.

9. A jack as defined in claim 1 in which said tongue bracket is located along one side of said tongue, clamp means located on the other side of said tongue, and bolts located above and below said tongue and securing said tongue bracket to said clamp means in order to anchor said tongue bracket to said tongue.

10. A jack as defined in claim 1 further including a mounting bracket welded to said tongue and having a series of tapped holes, said tongue bracket having a series of mounting holes alined with the holes of said mounting bracket, and screws extending through said mounting holes and threaded into said tapped holes to secure said tongue bracket to said mounting bracket and thereby anchor said tongue bracket to said tongue.

* * * * *